United States Patent Office 2,702,797
Patented Feb. 22, 1955

2,702,797

PROCESS FOR STABILIZING A POLYURETHANE

John S. Rugg, Wilmington, Del., assignor to E. I. du Pont de Nemours and Company, Wilmington, Del., a corporation of Delaware No Drawing. Application April 10, 1953,
Serial No. 348,113

2 Claims. (Cl. 260—45.8)

This invention relates to an improved process for the manufacture of elastomers. The invention relates more particularly to the hot milling of stabilized condensation polymers of polyalkylene ether glycols and arylene diisocyanates in which the polymer chain has been extended by reaction with water.

The condensation polymers with which this invention is concerned are prepared by the reaction of a polytetramethylene ether glycol with a tolylene diisocyanate and water, as more particularly described in co-pending applications Serial No. 297,990 filed July 9, 1952, by Hill, Serial No. 288,531 filed May 17, 1952, by Langerak, Prucino and Remington, and Serial No. 288,532 filed May 17, 1952, by Langerak. The condensation polymer so formed is stabilized against premature curing by treatment with a nitrogen base containing at least one hydrogen attached to the nitrogen, as more particularly disclosed in co-pending application of Nelson and Verbanc, Serial No. 305,912 filed August 22, 1952. A preferred stabilized condensation polymer may be prepared from 1 mol of a polytetramethylene ether glycol of average molecular weight of 2000 to 4000 reacted with from 2.0 to 2.5 mols of 2,4-tolylene diisocyanate, and then with at least 0.5 mol of water, after which the polymer is stabilized by the addition of from 0.5 to 2.0 parts of piperidine per 100 parts of polymer. This product is an amber to light yellow, tough, rubbery polymer which can be milled to a smooth band on a rubber mill.

Condensation polymers prepared by the reaction of polyalkylene ethers with arylene diisocyanates and water can be cured by intimately mixing the polymer with a diisocyanate and then heating in a mold under pressure. Once the diisocyanate is mixed with the condensation polymer there is a tendency for reaction to take place which results in a cross-linking set-up that causes a premature cure or scorch of the polymer. Scorching may be defined as a decrease in thermoplasticity due to incipient vulcanization. Scorching results in a lack of building tack and interferes with or prevents typical rubber processing operations such as milling, extrusion, calendering or molding, thus making fabrication into useful articles difficult or impossible.

When the compounded polymer scorches at room temperature on standing, it is sometimes called "bin scorch" to differentiate it from "mill scorch" which occurs on the rubber mill. The rate of scorching increases as the temperature increases. Scorching on a mill frequently occurs in the condensation polymers under consideration within from 1 to 5 minutes after the diisocyanate is added, at temperatures of from 200° to 250° F.

Different lots of polyalkylene ether glycol-arylene diisocyanate-water polymers often exhibit different scorching rates or scorch times. Bin scorch time is defined as the time interval between the addition of the diisocyanate curing agent and the time that the polymer begins to become unmillable. Mill scorch time is defined as the time interval between the start of milling with additional diisocyanate and the time when scorching becomes evident on the mill. The mill scorch time may vary from about 1 to about 20 minutes with various lots of polymer. It is sometimes impossible to thoroughly mix the curing agent into the polymer before scorching takes place.

It is an object of this invention to provide a process for improving the scorching properties of the polytetramethylene ether glycol-tolylene diisocyanate polymers by a simple procedure which involves merely a hot milling of the polymer.

I have found that the tetramethylene ether glycol-tolylene diisocyanate condensation polymers which have been extended by reaction with water can be improved materially in their scorching properties by a somewhat prolonged milling at temperatures of from about 300° to 360° F. During this milling the polymer may become sufficiently tacky to require the use of a doctor blade to remove it. However, this processing may be carried out on conventional rubber industry equipment which requires no particular modification.

The temperatures as above stated are relatively specific, for milling at temperatures substantially below 300° F. gives only slight improvement in the scorch time of the polymers under consideration. If the temperature is allowed to go much above 360° F. the polymer has a tendency to become fluid and it is difficult to keep it on the mill. While milling at the temperatures within the range above specified demonstrably affects the polymer after about 10 minutes, it will be found that in most cases the milling should be carried out for at least 20 minutes and in some cases up to one hour. The time of milling will vary inversely with the temperature employed since higher temperatures require shorter times. In general there is no added benefit in continuing the milling for more than one hour, although longer time of milling does not appear to be harmful.

The following examples are given to illustrate the invention.

Example 1

A polymer is made by the following procedure: One molar proportion of polytetramethylene ether glycol (average molecular weight 2900), which contains 0.24% of water and has an acid number 1.6, is put in a Werner-Pfleiderer mill which is heated to about 75° C. to melt it. There is then added 2.3 molar proportions of 2,4-tolylene diisocyanate and milling is carried on for about 20 minutes at about 100° C. There is then added 1.17 molar proportions of water and milling is continued for 50 minutes. The mass then resembles crumbs. It is removed from the Werner-Pfleiderer mill and sheeted out to a smooth band on a rubber mill. There is then added immediately while working on the mill about 1 part of piperidine per 100 parts of polymer to stabilize it.

400 grams of this polymer are then milled on a rubber mill at 330° C. for 20 minutes. The mill rolls are approximately 6 inches in diameter and 12 inches long. The speed ratio of the front roll to the back roll is 1.0:1.32 and the surface speed of the front roll is 38.3 feet per minute. The temperature of the rolls is controlled at 330±5° F. As soon as the polymer has banded out, the working distance or nip is adjusted so that an active rolling bank of stock about one-half inch in diameter forms at the nip. The polymer adheres to the mill and must be scraped off with a doctor knife. At the end of 20 minutes the polymer is removed from the mill.

100 parts of this milled polymer is then put on a cold rubber mill at about 80° to 100° F. and 6 parts of the dimer of 2,4-tolylene diisocyanate are milled in.

The scorch time is determined by putting a portion on an unheated rubber mill and milling and allowing the temperature to increase due to friction and shearing without circulating any coolant through the mill.

A control sample which had not been hot milled is also compounded the same way and tested for scorch. The samples are compared below:

|  | Control Sample | Sample Milled at 330° F. |
|---|---|---|
| First evidence of Scorch: | | |
| Time_____minutes__ | 25 | 38 |
| Temperature, ° F., attained_____ | 230 | 235 |
| Complete scorch: | | |
| Time_____minutes__ | 36 | 64 |
| Temperature, ° F., attained_____ | 255 | 255 |

Thus it will be seen that the control sample is completely scorched before the hot milled sample shows the first evidence of scorch. By complete scorch is meant the stage at which the polymer is so completely cured that it will no longer ride on the mill.

Example 2

Other portions of the polymer prepared in Example 1 are treated the same way except that the curing agent is 2,4-tolylene diisocyanate. The improvement is shown below:

|  | Control Sample | Sample Milled at 330° F. |
|---|---|---|
| First evidence of scorch: | | |
| Time_____minutes__ | 40 | 46 |
| Temperature, °F., attained_____ | 240 | 240 |
| Complete scorch: | | |
| Time_____minutes__ | 58 | 105 |
| Temperature, °F., attained_____ | 255 | 255 |

In this case, the first evidence of scorch in the milled polymer shows up more quickly than when the dimer is used but the complete scorch time is nearly double that of the control.

Example 3

The polymer is made as in Example 1 from:

1 mol polytetramethylene ether glycol (average molecular weight 3100, acid number 0.56, water 0.11%)
2.3 mols 2,4-tolylene diisocyanate
1.09 mols water and is stabilized with 0.5 part of piperidine per 100 parts of polymer.

400 grams of the polymer are milled as in Example 1 at 300°±5° F. for 40 minutes. It is then compounded with 40 g. of the dimer of 2,4-tolylene diisocyanate and tested for scorch time as before. The initial scorch time is greater than 7 minutes, while a control sample which has not been milled is scorched before the dimer is completely dispersed in the polymer. The milled sample is removed from the scorch test mill and cured in a mold under pressure for 60 minutes at 274° F. It has a tensile strength at the break of 4575 pounds per square inch, and elongation at the break of 550%, a modulus at 300% elongation of 1175 pounds per square inch.

Example 4

A polymer is made as in Example 1 from the following:

1.0 mol polytetramethylene ether glycol (average molecular weight 3350, acid number 0.82, water—0.18%)
2.3 mols 2,4-tolylene diisocyanate
1.09 mols water and is stabilized with 1.39 parts of piperidine per 100 parts of polymer.

400 grams are then milled at 330°±5° F. on the 6 x 12 inch rubber mill for 10 minutes. It is removed and compounded with 40 grams of the dimer of 2,4-tolylene diisocyanate. A control sample is similarly compounded. Both samples are stored at room temperature for 2 days. On inspection at the end of this time it is found that the control sample is severely scorched, while the one milled at 330° F. is completely free of any sign of scorch.

Any of the stabilizing agents of the class consisting of nitrogen bases, having at least one hydrogen attached to nitrogen, that are disclosed in co-pending application of Nelson and Verbanc Serial No. 305,912 may be substituted for the piperidine used in the above examples. As there disclosed, operable stabilizing agents of this class include ammonia and salts such as ammonium carbonate hydrate which decompose under reaction conditions to yield ammonia; alkyl amines, either saturated or unsaturated, such as mono- or diethylamine, n-btuylamine, di-n-butylamine, diisobutylamine, and allylamine; aryl amines, such as aniline; aralkyl amines, such as benzylamine; mixed alkyl-aryl secondary amines such as N-methyl aniline; alicyclic amines, such as cyclohexylamine and dicyclohexylamine; and heterocyclic nitrogen bases, such as piperidine, morpholine and ethyleneimine.

Any organic diisocyanate compound which under the curing conditions is converted to a diisocyanate may be employed as a curing agent in this process.

I claim:
1. A process for improving the scorching properties of elastomers comprising polytetramethylene ether glycol-toluene diisocyanate polymers in which the polymer chain has been extended by reaction with water and which have been stabilized by the addition of a nitrogen base having at least one hydrogen attached to nitrogen, which comprises milling the stabilized polymer prior to the addition of a curing agent for from 10 to 60 minutes at temperatures of from about 300° F. to about 360° F.

2. A process for improving the scorching properties of elastomers comprising polytetramethylene ether glycol-toluene diisocyanate polymers in which the polymer chain has been extended by reaction with water and which have been stabilized by the addition of piperidine, which comprises milling the stabilized polymer prior to the addition of a curing agent for from 10 to 60 minutes at temperatures of from about 300° F. to about 360° F.

No references cited.